United States Patent
Chen et al.

(10) Patent No.: US 11,554,731 B2
(45) Date of Patent: Jan. 17, 2023

(54) HISTORY-BASED AND LOCATION-BASED CONTROL OF VEHICLE KEY-OFF LOADS

(71) Applicant: FORD GLOBAL TECHNOLOGIES, LLC, Dearborn, MI (US)

(72) Inventors: Hanyang B. Chen, Canton, MI (US); Michael J. Irby, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 176 days.

(21) Appl. No.: 17/224,194

(22) Filed: Apr. 7, 2021

(65) Prior Publication Data

US 2022/0324399 A1     Oct. 13, 2022

(51) Int. Cl.
*B60R 16/023* (2006.01)
*B60W 10/08* (2006.01)

(52) U.S. Cl.
CPC ........ *B60R 16/0232* (2013.01); *B60W 10/08* (2013.01); *B60W 2510/242* (2013.01); *B60W 2510/30* (2013.01); *B60W 2556/10* (2020.02); *B60W 2710/30* (2013.01); *B60W 2710/305* (2013.01)

(58) Field of Classification Search
None
See application file for complete search history.

(56) References Cited

U.S. PATENT DOCUMENTS

| | | | | |
|---|---|---|---|---|
| 8,224,402 B2 * | 7/2012 | Sengupta | .............. | G06F 1/3287 |
| | | | | 455/343.1 |
| 8,384,240 B2 * | 2/2013 | Sato | ........................ | G04R 20/04 |
| | | | | 307/10.6 |
| 8,682,525 B1 * | 3/2014 | Kalinadhabhotla | ....... | G06F 7/00 |
| | | | | 340/442 |
| 8,954,230 B2 * | 2/2015 | Kalinadhabhotla | .... | G07C 5/008 |
| | | | | 340/442 |
| 9,162,585 B2 * | 10/2015 | Hanna | ................... | B60L 3/0046 |

(Continued)

FOREIGN PATENT DOCUMENTS

| | | | | |
|---|---|---|---|---|
| CN | 104786854 A | * | 7/2015 | .............. B60L 1/003 |
| CN | 105857102 A | * | 8/2016 | |

(Continued)

*Primary Examiner* — Kevin R Steckbauer
(74) *Attorney, Agent, or Firm* — MacMillan, Sobanski & Todd, LLC; Frank L. Lollo

(57) ABSTRACT

An electrical system in a vehicle has a battery is configured to supply electrical current when a driver ignition key is in a Key-Off state. A. A plurality of electrical loads are each configurable to receive the electrical current flowing from the battery during the Key-Off state depending upon predetermined Key-Off-Load (KOL) Modes. A vehicle locator determines a geographic location of the vehicle. A sleep-time database records daily Key-On and Key-Off events according to changes between the Key-On state and the Key-Off state, wherein each Key-Off event is associated with a respective geographic location from the vehicle locator. An analyzer identifies Key-Off events sharing a repetitive time span and a common geographic location. A scheduler activates a timed KOL sequence according to the identified Key-Off events so that repetitive time slots of vehicle usage can be used to reduce battery drain during times when vehicle usage is less likely.

14 Claims, 4 Drawing Sheets

(56) References Cited

U.S. PATENT DOCUMENTS

| | | | |
|---|---|---|---|
| 9,248,789 B2* | 2/2016 | Quintero | B60R 16/0231 |
| 9,283,827 B2* | 3/2016 | Nishida | B60H 1/00771 |
| 9,452,720 B2* | 9/2016 | Brey | B60R 16/0231 |
| 9,462,545 B2* | 10/2016 | Kleve | H04W 52/0209 |
| 10,035,517 B2* | 7/2018 | Lovett | H04L 67/10 |
| 10,093,197 B2* | 10/2018 | Deljevic | B60R 16/03 |
| 10,106,038 B2* | 10/2018 | Jiang | H01M 10/425 |
| 10,217,297 B2* | 2/2019 | DeCia | H04N 5/23222 |
| 10,363,796 B2* | 7/2019 | DeCia | B60H 1/00657 |
| 10,378,919 B2* | 8/2019 | DeCia | B60W 40/12 |
| 10,678,530 B2* | 6/2020 | Sangameswaran | H04L 67/34 |
| 10,766,368 B2* | 9/2020 | Jiang | B60L 58/13 |
| 10,861,255 B1* | 12/2020 | Karp | G07C 5/0841 |
| 10,889,199 B2* | 1/2021 | Birek | B60L 58/12 |
| 2011/0054708 A1* | 3/2011 | Sato | G04R 20/04 |
| | | | 700/286 |
| 2014/0172190 A1* | 6/2014 | Kalinadhabhotla | G06F 7/00 |
| | | | 701/1 |
| 2014/0183939 A1* | 7/2014 | Jiang | H01M 10/425 |
| | | | 429/231.1 |
| 2015/0191138 A1* | 7/2015 | Quintero | B60R 16/0231 |
| | | | 701/33.9 |
| 2015/0202980 A1* | 7/2015 | Hanna | B60L 58/27 |
| | | | 701/22 |
| 2016/0082975 A1* | 3/2016 | Lovett | B60W 10/30 |
| | | | 701/2 |
| 2017/0174157 A1* | 6/2017 | Deljevic | B60L 58/12 |
| 2018/0304836 A1* | 10/2018 | DeCia | B60H 1/00778 |
| 2018/0306598 A1* | 10/2018 | DeCia | B60W 40/12 |
| 2018/0308293 A1* | 10/2018 | DeCia | G07C 5/008 |
| 2019/0054827 A1* | 2/2019 | Jiang | B60L 58/20 |
| 2019/0143831 A1* | 5/2019 | Birek | B60L 58/14 |
| | | | 701/22 |
| 2019/0212997 A1* | 7/2019 | Sangameswaran | H04L 67/52 |
| 2019/0359063 A9* | 11/2019 | Jiang | B60L 50/66 |
| 2022/0324399 A1* | 10/2022 | Chen | B60R 16/0232 |

FOREIGN PATENT DOCUMENTS

| | | | | |
|---|---|---|---|---|
| CN | 105857102 B | * | 12/2017 | |
| CN | 106240375 B | * | 6/2018 | |
| CN | 111332248 A | * | 6/2020 | B60R 25/1004 |
| DE | 102018109110 A1 | * | 10/2018 | B60R 16/0231 |
| DE | 102018109113 A1 | * | 10/2018 | B60R 16/0231 |
| DE | 102018109123 A1 | * | 10/2018 | B60H 1/00657 |
| EP | 2290215 A2 | * | 3/2011 | G04R 20/04 |
| EP | 2290215 B1 | * | 1/2014 | G04R 20/04 |
| GB | 2547511 A | * | 8/2017 | B60L 1/003 |
| GB | 2563976 A | * | 1/2019 | B60R 16/0231 |
| GB | 2564193 A | * | 1/2019 | B60R 16/0231 |
| GB | 2564195 A | * | 1/2019 | B60H 1/00657 |
| GB | 2568465 A | * | 5/2019 | B60L 3/12 |
| GB | 2569447 A | * | 6/2019 | B60L 3/12 |
| JP | 2004146075 A | * | 5/2004 | B60L 11/1861 |
| WO | WO-2014105721 A2 | * | 7/2014 | B60L 1/08 |

* cited by examiner

|       | MOD1  | MOD2  | MOD3  | MOD4    | RELAY1 |
|-------|-------|-------|-------|---------|--------|
| KOL-1 | SLEEP | SLEEP | OFF   | OFF     | OFF    |
| KOL-2 | SLEEP | SLEEP | OFF   | SLEEP   | OFF    |
| KOL-3 | SLEEP | ON    | OFF   | PARTIAL | OFF    |
| KOL-4 | SLEEP | ON    | SLEEP | ON      | ON     |

HISTORY-BASED AND LOCATION-BASED CONTROL OF VEHICLE KEY-OFF LOADS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to battery power management in an automotive vehicle, and, more specifically, to manipulating the timing of various power states of electrical loads (e.g., vehicle sleep states) in order to avoid depletion of a vehicle battery while a vehicle is parked and to reduce battery drain that may accumulate during times that the vehicle is left unused for significant amounts of time while providing a fast response time for reactivation of the loads when a driver accesses the vehicle.

A typical automotive electrical system relies on a storage battery to power electrical system loads during times when a main electrical power source is inactive/inaccessible. In a gas-powered vehicle, the main electrical power source typically includes an alternator/generator driven by an internal combustion engine (which is started by a starter motor that is also powered by the storage battery). In an electric propulsion vehicle, the main electrical power source typically includes a high voltage/high capacity battery pack (also known as a high-voltage traction battery, which is electrically isolated when the vehicle is off, and which becomes accessible during driving by closing high voltage contactors or relays which are energized using the storage battery). Typically, the high voltage battery for vehicle propulsion supplies up to several hundred volts and has a capability of multiple-tens or hundreds of kilowatts-hour energy storage. The storage battery is a low-voltage battery, typically a 12 v battery (which may be identical to storage batteries used in a combustion engine vehicle). The storage battery has a finite charge capacity which is much smaller than the high-voltage propulsion battery, and it is important to maintain sufficient energy storage to start up the vehicle (e.g., start the combustion engine or close the high voltage contactors).

In a typical electric propulsion vehicle, a DC-to-DC converter is used to couple the high-voltage electric bus (powered by the high-voltage battery) to a low-voltage bus which supplies most conventional electrical loads (e.g., radio, cooling fan, lighting, and almost all ECUs used for vehicle control). The DC-to-DC converter also transfers electric energy from the high-voltage battery to the low-voltage storage battery when the low-voltage battery SOC (State-of-Charge) is lower than a certain threshold to recharge the low-voltage battery and restore its ability to support electrical loads on the low-voltage bus when the electric propulsion system is Off. A relay, which is powered by the low-voltage battery, can be used to turn the DC-to-DC converter On and Off. For example, the converter is turned off during vehicle sleep. The converter may be automatically turned On when it is detected that the low-voltage battery SOC is lower than the threshold, so that the low-voltage battery can be charged to a higher value.

In this scenario, the DC-to-DC converter may be frequently turned On during vehicle sleep in order to charge the low-voltage battery. Consequently, the remaining SOC of the high-voltage battery will be reduced (whereby the vehicle driving distance before recharging the high-voltage battery is also reduced). In addition, charging/discharging throughput of the low-voltage battery will be increased with the frequent discharging (by the KOL with higher current draw) and frequent recharging. Battery failure rate is directly proportional to the battery lifetime-accumulated charging/discharging throughput, and battery warranty will be increased for vehicles with high KOL.

Many modern electronic vehicle systems operate continuously even when the vehicle is in a parked, unattended state when the storage battery is the only available power source. Examples of electronic modules that must be powered at all times include those that perform functional operations while parked (e.g., antitheft systems and remote entry systems) and those that just need a reduced amount of power to maintain memory contents or monitor/measure various conditions or electrical communication signals (e.g., in a sleep mode). Other modules may continue to operate for a specified time after the driver shuts off the vehicle, but can be powered off after the specified time (e.g., courtesy lighting).

Since a vehicle may remain parked for long periods of time, it is important to limit battery drain so that a sufficient battery state-of-charge is still available to activate the vehicle (e.g., start the engine or close the contactors) when the user returns. Therefore, the vehicle manufacturer specifies limits for the current drawn by various modules under each of the conditions which may arise. In particular, quiescent current limits are set for the modules which apply during times that the vehicle ignition switch has been OFF for a specified time and there has been no user activity. On the other hand, some loads such as a large screen driver information system (e.g., the Ford Sync® system) may take an undesirably long time to activate (e.g., boot up) if they have been put into a fully depowered state or low-powered (sleep) state so that a driver has to wait to use the device as intended. Therefore, multiple levels of sleep states (e.g., from a light sleep state to a deep sleet state) can be used which drop to progressively lower current levels after longer periods of time as a tradeoff between quick availability of a driver information system and the preservation of sufficient battery power for restarting the vehicle.

To increase the time spans for which a light sleep mode can be maintained, a storage battery having a larger charge capacity is sometimes used. The bigger battery allows a higher draw for a certain period of time, but the time available for the light sleep mode is still limited. Furthermore, various penalties are incurred with respect to vehicle cost, packaging space, weight, and warranty costs.

In a multi-level Key-Off-Load management system, there may be a first (deepest) KOL Mode referred to as KOL-1 which allows a maximum quiescent current of no more than 8 milliamps (mA). KOL-1 is typically used only in a newly manufactured vehicle during a vehicle transport mode when it is being delivered to a dealership. A next deepest KOL Mode referred to as KOL-2 may allow a maximum quiescent current of no more than 20 mA. This may be considered to be a normal sleep state in which some modules are still partially powered (e.g., to provide capability of entry keypad detection and other vehicle normal monitoring operations) during the Key Off condition. A KOL-3 Mode may be provided which allows a maximum quiescent current of up to 50 mA in order to allow full activation of some features. For example, luxury vehicles may operate a Welcome function such as welcome lighting based on detection of the approach of the user to the vehicle (e.g., polling to detect a wireless device on the user). A KOL-4 Mode may be provided which allows a maximum quiescent current of up to 500 mA. This higher level of current draw may be used to keep large display panels or other ECU and computerized systems partially powered during vehicle sleep to provide for a quick bootup (e.g., a few seconds instead of 30 seconds or more for a depowered display system). Even with enhanced storage battery capacities, a KOL-4 Mode can typically be maintained for only about 14 to 24 hours. It should be noted that not all four of the above modes would necessarily be implemented in any particular vehicle, and a fewer number of modes can be used. For example, the KOL-3 Mode and KOL-4 Mode as described above may be combined into a single mode (i.e., a Welcome function and fast-bootup mode of a display system can be controlled together). Furthermore, the KOL modes are subsets of one another, such that when KOL-4 is On then KOL-1, KOL-2, and KOL-3 are also On, when KOL-3 is On then KOL-1 and KOL-2 are also On, and when KOL-2 is On then KOL-1 is also On. In other words, a higher mode may activate certain loads at a higher current draw but any loads other than the ones specifically modified for that mode continue to operate as defined at the lower modes.

In view of the disadvantages of known power management schemes, it would be desirable to manage key-off-loads in a manner that better preserves battery capacity while improving the duration of time over which fast bootups can be obtained.

SUMMARY OF THE INVENTION

In one aspect of the invention, an electrical system in a vehicle comprises a driver control responsive to a driver for entering a Key-On state or a Key-Off state. A battery management system (BMS) and vehicle control system are configured to supply electrical current during the Key-Off state. A plurality of electrical loads are each configurable to receive the electrical current flowing from the battery during the Key-Off state depending upon predetermined Key-Off-Load (KOL) Modes. A vehicle locator determines a geographic location of the vehicle. A sleep-time database records daily Key-On events and Key-Off events according to changes between the Key-On state and the Key-Off state, wherein each Key-Off event is associated with a respective geographic location from the vehicle locator. An analyzer identifies Key-Off events sharing a repetitive time span and a common geographic location. A scheduler activates a timed KOL sequence according to the identified Key-Off events.

A Key-On or a Key-Off state as used herein refers to vehicle activated and deactivated states which are controlled not only using a physical key and lock but also controlled using a push button switch, keypad, voice commands, or wireless devices such as a key fob or a smartphone having a Phone-as-a-Key (PaaK) application.

DETAILED DESCRIPTION OF PREFERRED EMBODIMENTS

Figure 1:
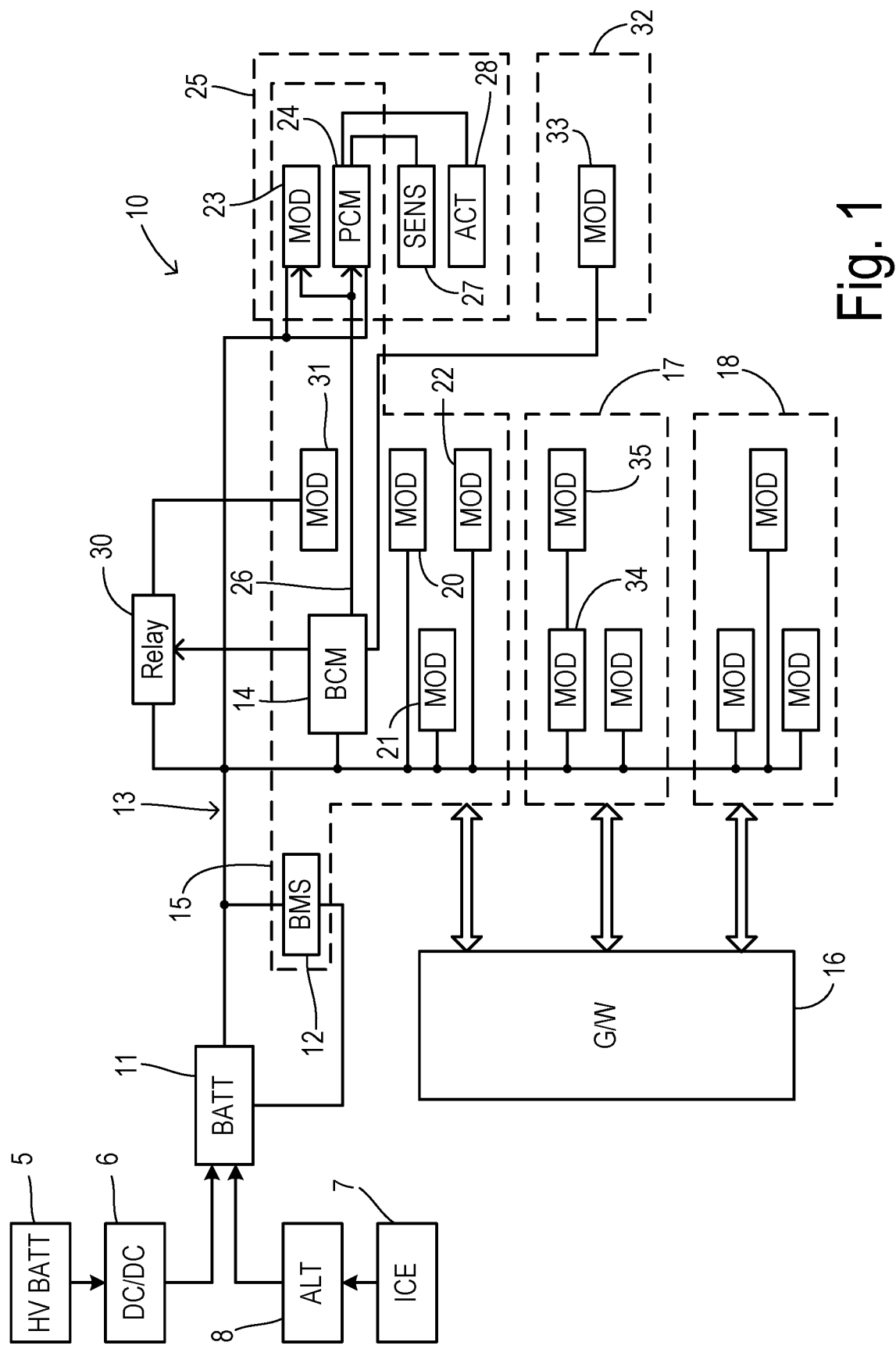
FIG. 1 is a block diagram showing one embodiment of an electrical architecture for distributing electrical power and multiplex communication signals in which KOL power management is implemented.

FIG. 1 shows an example architecture for an electrical system 10 having a storage battery 11 connected to a battery monitoring system (BMS) 12. BMS 12 may be a conventional component which, among other things, measures battery current flow passing from battery 11 to the electrical loads. When part of an electric propulsion vehicle, low-voltage storage battery 11 may be recharged from a high-voltage battery pack 5 via a DC-to-DC converter 6. When part of a gas propulsion vehicle or a hybrid vehicle, storage battery 11 may be recharged by an alternator 8 driven by an internal combustion engine 7.

A body control module (BCM) 14 and BMS 12 are both contained within and communicate over a bus network (linking the electronic modules within a grouping 15), such as a CAN bus. Bus network 15 interconnects with a gateway 16 which further connects with additional bus networks 17 and 18 which may operate using different protocols. Gateway 16 re-formats and passes messages between networks so that modules in different bus networks can exchange communication signals as known in the art. A power bus 13 distributes an output of battery 11 to various modules including BCM 14 and many other modules, including a set of modules 20-22 which are interconnected by bus network 15 (e.g., in the same bus network as BCM 14) or could be in other bus networks 17 or 18.

Also interconnected within bus network 15 are a module 23 and a powertrain control module (PCM) 24. Power to modules 23 and 24 is controlled by BCM 14 as a sub-net 25 (e.g., they have their power managed by BCM 14 as one unit). As used herein, a sub-net is a group of controller modules which share a power management status as controlled by BCM 14. Both modules 23 and 24 receive a supply voltage directly via power bus 13, but each receives shared control signals 26 from BCM 14 in order to activate or deactivate power to modules 23 and 24 simultaneously. Although shown as a separate connection, control signals 26 would typically be comprised of multiplex messages sent via bus network 15. Control messages from BCM 14 may further include commands which control power delivery to subordinate components of a control module, such as sensors 27 and actuators 28 which receive power through PCM 24.

In another example of power management, BCM 14 is connected to a relay 30 which receives power from power bus 13 and selectably transmits power to a module 31. Relay 30 can, for example, be comprised of an ignition relay. Module 31 is further connected with bus network 15. Relay 30 may be controlled by a direct signal connection with BCM 14 or alternatively via a multiplex message. However, rather than having a sleep mode, module 31 is either fully powered or fully depowered according to the ON/OFF state of relay 30. On the other hand, modules 23 and 24 in sub-net 25 are powered at all times from power bus 13, but each invokes a respective reduced-power mode such as a sleep state. Electrical system 10 may include additional sub-nets such as a sub-net 32 having a module 33 which in this case receives power through BCM 14. Accordingly, BCM 14 includes an internal relay for selectively coupling power to sub-net 32.

Bus networks 17 and 18 may likewise include various controller modules receiving power directly from power bus 13 as shown. In addition, there may be modules such as a module 35 which receives power only through another module (e.g., module 34). It is possible that BCM 14 could control a reduced-power mode of module 35 either directly via command signals sent through gateway 16 or via commands delivered to module 34 for controlling whether or not power is passed through module 34 to module 35. In some embodiments (e.g., in an electric-propulsion vehicle), any functions described herein for BCM 14 can instead be performed by BMS 12 or any other available electronic module for implementing load management.

Figures 2, 4:
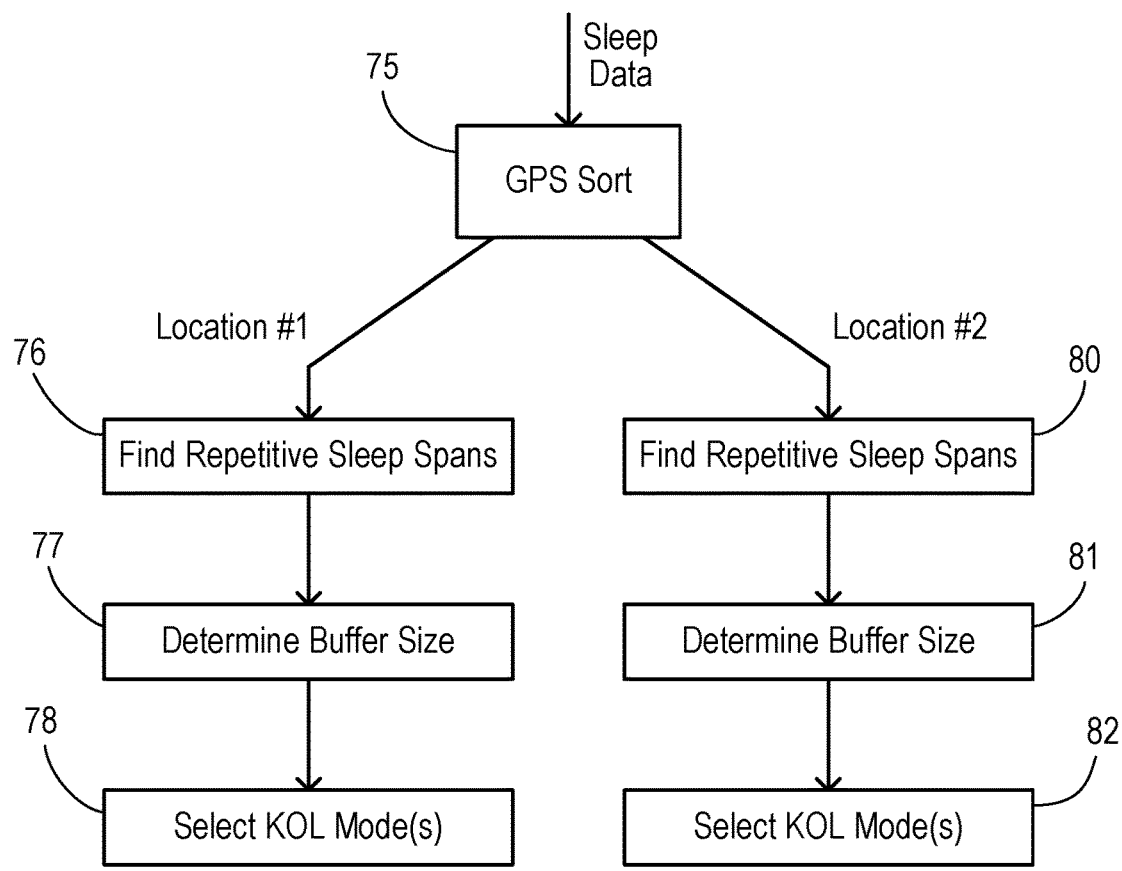
FIG. 2 is a diagram showing status of various electrical loads for different KOL modes.
FIG. 4 is a flow diagram showing filtering of vehicle usage data according to geographic location.

FIG. 2 has a table 36 which shows an example of the status of some hypothetical loads according to selected KOL sleep modes in which four possible states of the electrical system are provided. Quiescent current limits are lowest for KOL-1 and gradually increase to the highest for KOL-4. Loads designated as modules MOD1, MOD2, MOD3, and MOD4 can be in an Off state with no power, a Sleep state with minimal power, a Partial state with just some functions fully powered, and an On state with full power. A relay load designated RELAY1 can be either Off or On. In the arbitrary scheme shown in FIG. 2, the loads are all either Off or in the Sleep state when the KOL-1 Mode is in effect. In KOL-2 Mode, an additional module is activated into a Sleep state and may have the possibility to partially wake up even more if it detects some monitored condition. A next upward step in current draw is provided by a KOL-3 Mode in which some modules have been increased to a partially powered state or a fully powered state while others remain in a Sleep state or Off. In KOL-4 Mode, RELAY1 is turned on while modules MOD3 and MOD4 are activated at higher current draw (and while the status of other modules remains unchanged).

Instead of only choosing to proceed from one KOL mode to an increasingly deeper KOL mode based on the length of time that a vehicle has been in a Key Off condition as in the prior art, a preferred embodiment of the invention selects a timing of switching between KOL modes according to a usage history of each particular vehicle on an adaptive basis. In order to reliably predict patterns of vehicle usage, the parked location of the vehicle is employed to ensure that behaviors leading to the usage history truly reflect normal routines of the vehicle user.

The history-based KOL mode control can preferably be used together with the duration-based control which progressively imposes more stringent KOL modes based on length of time since Key-Off, providing two important advantages. First, a more stringent KOL mode can be entered sooner based on a prediction that the parked vehicle will not be used for a while, thereby further conserving battery charge. Second, a less stringent KOL mode can be entered when a time is approaching at which the vehicle is likely to be started, thereby improving vehicle responsiveness to the user and shortening activation (e.g., boot-up) times.

Figure 3:
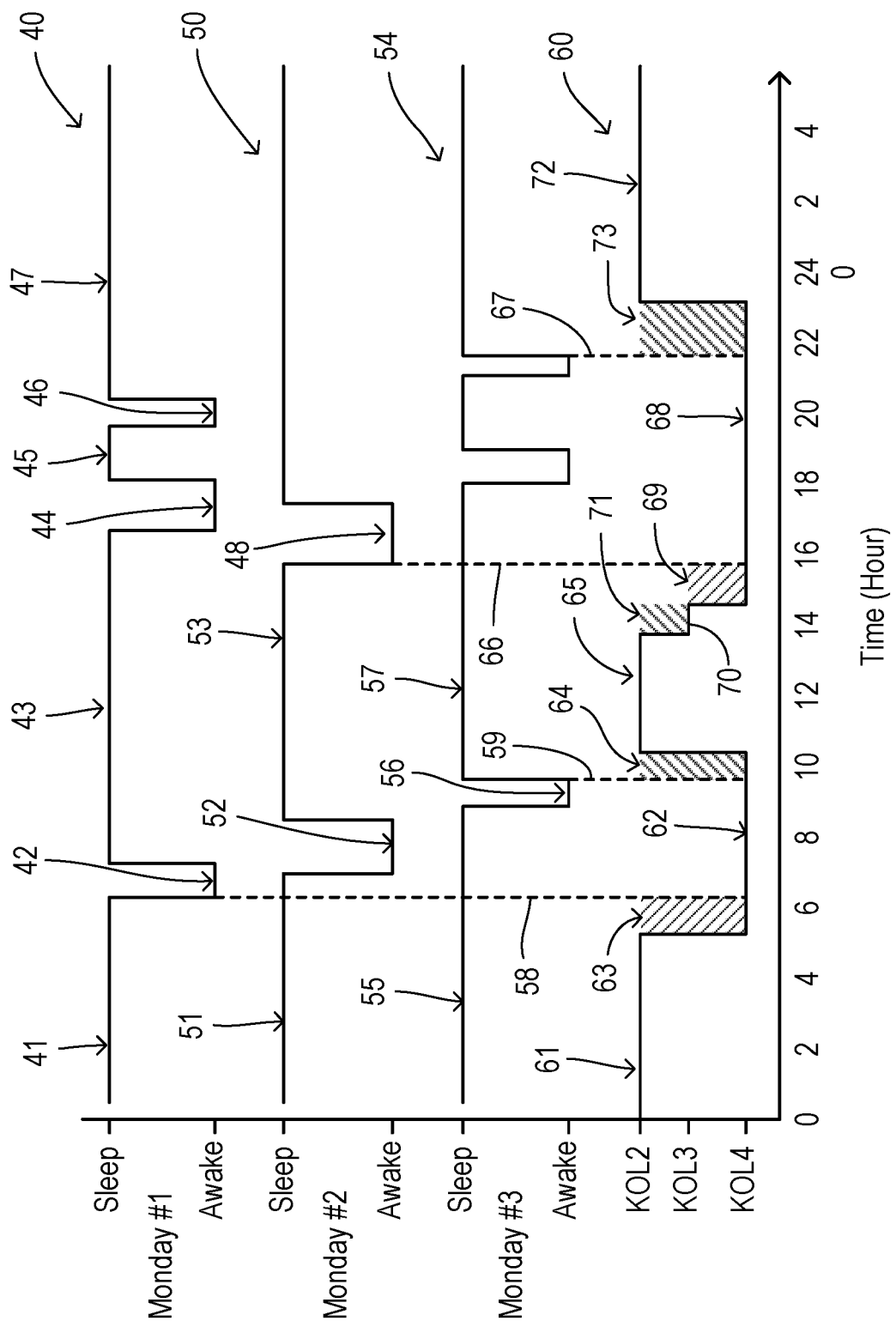
FIG. 3 shows a plot of vehicle usage for a recurring day of the week and a corresponding selection of KOL modes.

FIG. 3 is a graph showing an example of history-based KOL mode control over repetitive time periods. The time periods for comparison may preferably be comprised of separate days of the week. Furthermore, the historical sleep/awake data to be compared is required to be collected at the same geographic location. As used herein, the same location refers to a region or zone large enough to encompass a place such as a parking lot at a place of business. The region may be defined using a set of geographic coordinates within a predetermined range, whereby all coordinates within the range are considered to be a common location.

In this example, vehicle usage on previous Mondays is analyzed in order to predict vehicle activation times on future Mondays. A trace 40 shows sleep times and awake times of the vehicle on a first Monday in which the vehicle was asleep (i.e., Key-Off state) during an interval 41, awake during an interval 42, and asleep during an interval 43. Interval 42 may for example result from a regular morning commute to a place of work. The vehicle was again awake during intervals 44 and 46 and asleep during intervals 45 and 47. Interval 44 may for example result from a regular evening commute home.

A trace 50 shows sleep times and awake times of the vehicle on a second Monday in which the vehicle was asleep during intervals 51 and 53, and was awake during intervals 52 and 48. Awake time interval 52 roughly coincides with awake time interval 42 of the previous Monday, and awake time interval 48 roughly coincides with awake time interval 44 of the previous Monday. Trace 54 for a third Monday shows the vehicle was asleep for several intervals including intervals 55 and 57, and was awake for several intervals including an interval 56 also roughly corresponding to awake intervals 42 and 52 from prior Mondays.

Based on analysis of the historical sleep/awake times, a trace 60 shows a KOL schedule which controls the KOL Mode to provide a most aggressive limit on current draw during times that the vehicle is predicted to be unused and less aggressive limits during times that the vehicle is predicted to be used. For example, during late night and early morning hours before the vehicle activity shown by intervals 42, 52, and 56, a most aggressive KOL mode (e.g., KOL-2 Mode) is adopted during a command interval 61. A time span during which closely related awake intervals 42, 52, and 56 occur results in a command interval 62 in which a least aggressive KOL mode (e.g., KOL-4 Mode) is adopted. To account for variations in the actual time that vehicle usage may occur, command interval 62 is extended beyond a beginning time 58 and an ending time 59 of the time span that contains intervals 42, 52, and 56 by buffer periods 63 and 64. The duration of buffer periods 63 and 64 may be fixed or dynamically controlled. A typical fixed buffer period may be about one hour, for example. If dynamically controller, the duration of a buffer period may be proportional to a spreading of the Key-On events corresponding to the repetitive time span. The spreading may be determined according to factors such as 1) the size of the data set (e.g., the set of the most recent several events, such as the data recorded for the most recent 3 to 5 Mondays) which was used to estimate the existence of a repetitive time span, or 2) a statistical distribution of the awake intervals within the time span between beginning time 58 and ending time 59.

The schedule of trace 60 includes a command interval 65 during which the KOL mode returns to the most aggressive limit since the vehicle has historically been parked during this repetitive time span. However, the Mondays sleep/awake data shows a time span from a begin time 66 to an end time 67 which includes many apparently related awake intervals. Therefore, a command interval 68 with buffer periods 69 and 73 is scheduled. Thereafter, a command interval 72 returns to the most aggressive KOL mode for the remained of the Monday and the beginning of the following Tuesday. Thus, an aggressive KOL mode can be entered without waiting for the standard time (e.g., 14 hours in a stand time sequence) to expire.

A transition between predicted sleep times and awake times can also include steps between intermediate KOL modes. For example, a command interval 70 (between most aggressive command interval 65 and least aggressive command interval 68) provides an intermediate KOL mode (e.g., KOL-3 Mode). Command interval 70 may, for example, divide the initial buffer period for command interval 68 into separate buffer portions 71 and 69. Thus, if a statistical analysis provides an intermediate level of confidence of vehicle usage at a particular time, but not enough confidence to justify the highest level of current draw, then an intermediate KOL mode may provide a better tradeoff between battery savings and startup response time. FIG. 4 depicts a process for collecting and analyzing vehicle sleep data in order to create a KOL schedule. The process may preferably be performed in an on-board vehicle controller (such as a BCM or a BMS already involved in controlling the KOL mode) or can be performed off-board. Sleep data (which includes Key-On and Key-Off times and the geographic coordinates or other location information of the vehicle) are input to a location sorter 75. The location data may be comprised of GPS coordinates, and the sorting may take into account a predetermined range over which GPS coordinates are related to a common location. Sleep data relating to a Location #1 are analyzed along a first path in which repetitive sleep time spans are discovered in an analysis block 76. The sleep time span(s) may be found using pattern recognition or an artificial intelligence (AI) engine, for example. Based on the discovered repetitive time span(s), appropriate buffer size(s) are found in an analysis block 77. If intermediate KOL modes are optionally included, then the KOL mode(s) to be used for each repetitive interval are selected in an analysis block 78. For sleep data corresponding to a second location (Location #2), the same process is performed in analysis blocks 80, 81, and 82.

Whenever the vehicle is turned off at other than Location #1 or Location #2 (i.e., any location for which a history is unavailable) such as when the user is out of town, there are no estimated "sleep time spans." Therefore, the BMS control will revert to standard stepping down in KOL levels (e.g., a 14-hour or longer waiting time to allow high-KOL features followed by KOL modes with further reduced current levels). When out of town, there will be more battery drain, reduced battery life, and longer startup times unless sufficient usage data is compiled to support a meaningful historical analysis.

Figure 5:
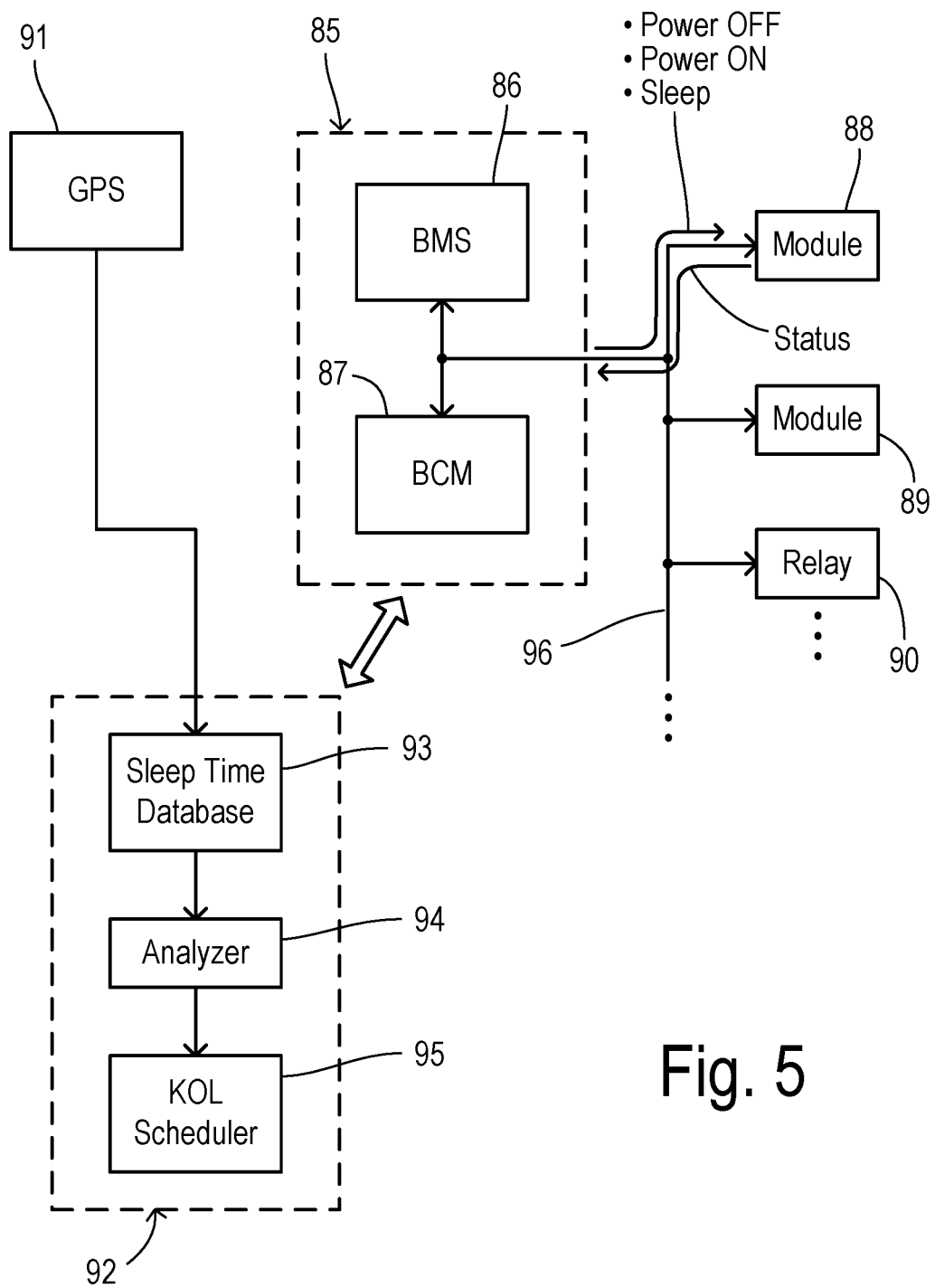
FIG. 5 is a block diagram showing one preferred embodiment of the invention.

FIG. 5 shows a portion of an automotive electrical system with a controller system 85 with a BMS 86 and a BCM 87 for monitoring and controlling electrical loads such as modules 88 and 89 and a relay 90. Each load is configurable to receive electrical current from the battery during the Key-Off state depending upon predetermined Key-Off-Load (KOL) Modes which are enforced by BMS 86 and/or BCM 87. Depending on the KOL Mode, modules 88 and 89 may be commanded to assume a Sleep state, Power On state, or Power Off state via command messages over a bus 96. Modules 88 and 89 may provide power status messages back to the controllers vid bus 96.

A vehicle locator to determine a geographic location of the vehicle may be comprised of a GPS receiver 91, as is commonly available in motor vehicles. A KOL controller 92 may be incorporated in BMS 86 and/or BCM 87 or may be in a standalone module or another electronic module in the vehicle. The GPS coordinates are provided to a sleep time database 93 in controller 92. Database 93 stores Key-Off times, Key-on times, and a location identifier (e.g., home or work) or geographic coordinates (e.g., latitude and longitude) associated with each Key-Off event. Thus, each event records a time span and a location each time that the vehicle is parked and turned off. An analyzer 94 receives the event data from database 93 to detect a repeated daily pattern. Based on the detected pattern, a KOL scheduler 95 adds buffer periods, selects intermediate KOL modes (if any), and then implements a sequence of KOL mode commands whenever the vehicle is, in fact, parked during a predicted time span.

In some embodiments, information relating to the KOL status may be pushed to a vehicle user. When a vehicle enters sleep mode (e.g., the ignition is turned off and the transmission is placed into PARK), the scheduled KOL mode adjustment information (e.g., times when the vehicle will enter KOL-2 Mode and will then exit KOL-2 Mode and will no longer provide a quick screen bootup or perform approach detection during this period) will be determined and can be made available for sharing. The information can be provided to a user's remote device (such as a smartphone or tablet) via a cloud connection or other wireless link. The information can also be displayed on vehicle control panel. Therefore, the user will not be surprised by any delays (e.g., slow bootup of a screen) or disabled features (e.g., no detection of approach leading to a Welcome function) in case they return to the vehicle at a time that differs from the times learned from the prior vehicle operation.

What is claimed is:

1. An electrical system in a vehicle comprising:
   a driver control responsive to a driver for entering a Key-On state or a Key-Off state;
   a battery configured to supply electrical current during the Key-Off state;
   a plurality of electrical loads each configurable to receive the electrical current flowing from the battery during the Key-Off state depending upon predetermined Key-Off-Load (KOL) Modes;
   a vehicle locator determining a geographic location of the vehicle; and
   an electronic controller configured to include:
   a sleep-time database recording daily Key-On events and Key-Off events according to changes between the Key-On state and the Key-Off state, wherein each Key-Off event is associated with a respective geographic location from the vehicle locator;
   an analyzer identifying Key-Off events sharing a repetitive time span and a common geographic location; and
   a scheduler for activating a timed KOL sequence according to the identified Key-Off events.

2. The electrical system of claim 1 wherein the analyzer identifies one or more clusters of Key-On events at a consistent time portion of a common day of the week over a plurality of weeks.

3. The electrical system of claim 2 wherein the timed KOL sequence adopts a first KOL Mode for times during the common day of the week not containing one of the clusters of Key-On events, wherein the timed KOL sequence adopts a second KOL Mode for times during the common day of the week containing one of the clusters of Key-On events, and wherein the first KOL Mode has a lower current flow limit than the second KOL Mode.

4. The electrical system of claim 3 wherein scheduler adds a buffer period to extend a section of the timed KOL sequence having the second KOL Mode.

5. The electrical system of claim 4 wherein the buffer period has a length proportional to a spreading of the Key-On events corresponding to the repetitive time span.

6. The electrical system of claim 1 wherein the vehicle locator is comprised of a GPS navigation system.

7. The electrical system of claim 1 wherein the common geographic location is comprised of a region having a predetermined size and within which a plurality of the Key-Off events coincide.

8. A method of limiting drain of a battery in a vehicle electrical system, wherein the battery is configured to supply electrical current to a plurality of electrical loads during a Key-Off state depending upon predetermined Key-Off-Load (KOL) Modes, the method comprising the steps of:

monitoring a driver control as being in the Key-On state or the Key-Off state;

determining a geographic location of the vehicle;

recording daily Key-On events and Key-Off events according to changes between the Key-On state and the Key-Off state, wherein each Key-Off event is associated with a respective geographic location;

identifying Key-Off events which share 1) a repetitive time span on a common day of the week during different weeks, and 2) a common geographic location;

activating a timed KOL sequence according to the identified Key-Off events when the Key-Off state is detected.

9. The method of claim 8, wherein the identifying step identifies one or more clusters of Key-On events at a consistent time portion of a common day of the week over a plurality of weeks.

10. The method of claim 9 wherein the timed KOL sequence adopts a first KOL Mode for times during the common day of the week not containing one of the clusters of Key-On events, wherein the timed KOL sequence adopts a second KOL Mode for times during the common day of the week containing one of the clusters of Key-On events, and wherein the first KOL Mode has a lower current flow limit than the second KOL Mode.

11. The method of claim 10 further comprising the step of adding a buffer period to extend a section of the timed KOL sequence having the second KOL Mode.

12. The method of claim 11 wherein the buffer period has a length proportional to a spreading of the Key-On events corresponding to the repetitive time span.

13. The method of claim 8 wherein the geographic location is determined using a GPS navigation system.

14. The method of claim 8 wherein the common geographic location is comprised of a region having a predetermined size and within which a plurality of the Key-Off events coincide.

* * * * *